Sept. 27, 1955  G. E. R. MURRAY  2,719,264

FLUID SHOCK-ABSORBING MEANS FOR GALVANOMETER

Filed Jan. 31, 1950

*INVENTOR.*
GEORGE E.R. MURRAY

BY

*Woodcock and Phelan*
ATTORNEYS

United States Patent Office 2,719,264
Patented Sept. 27, 1955

2,719,264

FLUID SHOCK-ABSORBING MEANS FOR GALVANOMETER

George E. R. Murray, Feasterville, Pa., assignor to Leeds and Northrup Company, Philadelphia, Pa., a corporation of Pennsylvania Application January 31, 1950, Serial No. 141,558

15 Claims. (Cl. 324—97)

This invention relates to galvanometers, more particularly to vibration-suppressing means for the suspension systems thereof, and has for an object the provision of improved means to prevent or suppress bothersome types of undesirable motion of a galvanometer suspension system without decreasing the sensitivity or affecting the desired motion of the moving element of the galvanometer.

Galvanometers of the type to which the present invention is particularly applicable include a movable element such as a magnetic needle or coil whose mass is great compared with that of its suspension system. Such a needle or a coil consisting of a plurality of turns of relatively small diameter wire is suspended by a single filament extending from a support to the element, an additional single filament frequently being provided which extends from the lower end of the element to another stationary support. Such galvanometers, because of the mass of movable elements which may ordinarily include a mirror, are subject to unwanted motions, vibrations, or oscillations of the movable element other than a rotational movement about the axis of the filamentary suspension means. For high sensitivity, the restoring force of such galvanometers is of a low order and, hence, it has been desirable to provide suppression means to shorten the period of time during which the undesired motions tend to persist.

Frictional systems for damping the undesired motions of filamentary suspensions have been proposed and while they have been found to be satisfactory, something was left to be desired in avoidance of the need for careful adjustment of the frictional system both at the factory and as a part of the maintenance of the instrument of which the galvanometer forms an important part. Such frictional systems have the added disadvantage of not being responsive to disturbances below a certain magnitude, which disturbances, however, are of sufficient magnitude to interfere with proper operation of the galvanometer.

It has also been proposed to support a drop of oil in contact with the parallel suspensions of an oscillographic element. In such cases the coil of the oscillographic element comprises the parallel suspensions which support a mirror and due to the oscillation of the coil tend to rotate the mirror about its own axis. By supporting the drop of oil adjacent the two filamentary conductors, damping was provided against free oscillation of the suspension as a result of an impulse due to an electric current flowing therethrough. Such a damping or vibration suppression system, however, interfered with and decreased the sensitivity of the oscillographic element by opposing motion of the filamentary conductors due to the flow of electric current therethrough.

In carrying out the present invention in one form thereof there is provided in encircling relation with the filamentary suspension means of the galvanometer coil a support of extended area for holding a liquid therein due to physical forces such as adhesion and surface tension. By encircling the galvanometer suspension with such a support, a substantial amount of liquid may surround the filament to provide a damping action, even though there be relatively wide transverse excursions of the filament due to vibration, shock, and the like. In a preferred form of the invention, the supporting structure for the liquid for suppressing or damping the undesired motion of the suspension comprises a helix or spiral which not only provides the extended area, but also provides open ends by means of which the spiral may at any time be threaded about the suspension and secured in place for support of the damping liquid about the suspension.

For a more detailed explanation of the invention and for further objects and advantages thereof, reference is to be had to the following detailed description taken in conjunction with the accompanying drawings, in which.

Figure 1:
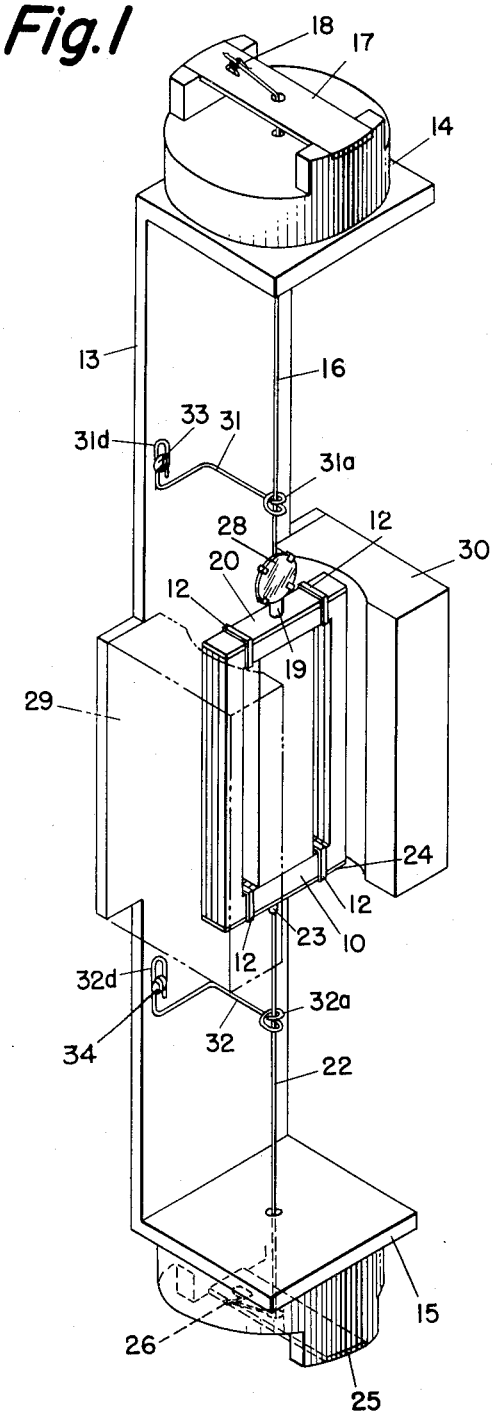
Fig. 1 is a perspective view of the galvanometer assembly to which the present invention has been applied.

Referring to Fig. 1, the invention in one form has been shown as applied to a galvanometer having a coil 10 formed by a plurality of turns of wire held together by adhesive and/or by binding 12. The coil is supported between an upper arm 14 and a lower arm 15 of a frame 13 by means of a filament 16 secured to a resilient member 17 as by soldering to an upturned tab 18 formed from the body of the resilient member 17. The lower end of the filament 16 is similarly soldered, or otherwise secured, to a post 19 extending upwardly from a plate 20 adhesively secured to the coil and/or bound thereto by the binding 12. A lower filament 22 has its upper ends secured to a post 23 of a plate 24 likewise held to the coil by the binding 12 and/or adhesive, while the lower end of filament 22 is similarly secured to resilient member 25 which may also be provided with a tab 26.

A mirror 28 is carried by the suspension and may be secured thereto by any suitable means such as a clip extending upwardly from the plate 20 as shown in detail in Williams et al. Patent 2,425,408, but which has been omitted from Fig. 1 for purposes of clarity except for the inturned ears thereof on the face of the mirror. The filaments 16 and 22 comprise the suspension means. Though they may be non-conductors such as glass, they ordinarily and preferably are conductors which form the leads to the opposite ends of the coil 10. In any case, the suspensions 16 and 22 are in general of small cross-section, either flat or round, and are filamentary in character. They may comprise wire having a diameter of the order of a fraction of a mil and in some cases the suspensions may be formed of wire of about 3 or 4 mils in diameter, depending upon the desired sensitivity of the galvanometer.

Current flow through the ocil 10 produces rotation thereof between pole pieces 29 and 30 of the associated magnetic structure of the galvanometer. A galvanometer is a sensitive measuring instrument, and by reason of the requirement of minimum opposition to desired rotational movement of the coil 10 about the axis of the suspension means 16 and 22, the coil is likewise subject to a variety of undesired movements.

Figure 2:
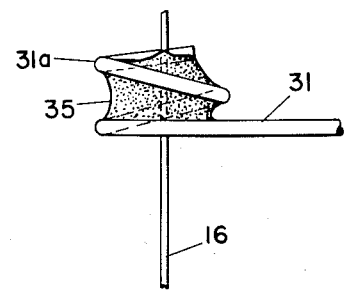
Fig. 2 is an enlarged view of a preferred form of undesired motion-suppressing means including the damping or vibration-suppressing liquid surrounding one of the suspension elements of Fig. 1.

In accordance with the present invention, a highly effective means for suppressing or damping the undesired movements of the suspensions is provided by supporting members 31 and 32, each having the outer ends 31a and 32a thereof shaped into a spiral or helix, several turns of which encircle the respective filaments 16 and 22. The inner ends 31d and 32d of supports 31 and 32 are formed into relatively long narrow loops and are secured to the frame 13 as by fastening screws 33 and 34. By providing a plurality of turns encircling each of the filaments, there is an extended support-area adjacent each filament, and as shown in Fig. 2, a relatively large body of a vibration-suppressing or damping liquid 35 is held by adhesion and surface tension within the turns of the outer end 31a of the support 31 with the filament 16 extending centrally therethrough. The loops on the inner ends 31d and 32d of the supports 31 and 32 provide for longitudinal adjustment of the supports along the axis of the filamentary suspension.

It is to be noted that rotation of the coil 10 about the axis of suspension means 16 and 22 produces rotary motion only of the filament 16 in the vibration-suppressing liquid 35. Such vibration-suppressing or damping liquid, though viscous in character, offers a minimum resistance to turning motion about the longitudinal axis of the filament and, hence, does not measurably affect the sensitivity or decrease the rotary movement of the coil for a given flow of current therethrough. On the other hand, any movement of the filament 16 away from the normal longitudinal axis thereof displaces a substantial amount of the liquid 35 and creates such effective opposition as rapidly to decrease or damp out all of the unwanted movements and yet does not interfere with the desired rotary motion of filament 16 and coil 10.

The foregoing is in contrast with prior art proposals which have been made in which a galvanometer suspension means and mirror as a whole have been immersed in liquid and in which the liquid has been utilized to oppose and provide damping for the desired movements of the mirror.

The structure of the present invention is simple and readily adaptable for application to existing galvanometers greatly to improve their performance, and it is believed to represent a major improvement in the art for reasons which will be made apparent by considering its action in connection with a number of typical unwanted movements of the galvanometer coil 10. If the frame 13 is subject to a disturbance which moves it forward in a direction normal to the plane of coil 10, the coil as a whole tends to be set into vibration or oscillation toward and away from the back of the frame 13. Then the filaments 16 and 22 would move transversely of the axis of suspension and againts the opposition offered by the continued displacement of the vibration-suppressing liquid 35, shown in Fig. 2. The result is rapid diminution of the unwanted motion, in some instances to such an extent that an oscillatory motion is prevented. The foregoing action obviously is equally effective regardless of the direction of displacement of frame 13 relative to coil 10.

Other jars which produce movement of the frame 13 at an angle with respect to the vertical axis of frame 13 will produce more complicated displacements of coil 10, all of which are undesired. For example, a twisting motion of frame 13 about a horizontal axis passing through the center of the coil may cause the coil to turn about such central axis, thus moving the filaments 16 and 22 in opposite directions. While the upper filament 16 will move in one direction through its vibration-suppressing liquid, the lower filament 22 will move in an opposite direction through its vibration-suppressing liquid; nevertheless, the damping or motion-suppressing action remains effective and the undesired oscillation or vibration is prevented or rapidly diminished or damped. Other examples could be given, but they would in general be similar to or include components of the type already described. It is, therefore, sufficient to point out that the vibration-suppressing liquid 35 is effective to apply a damping action on the filamentary suspension means for all movements thereof tending to displace it from its normal axis of rotation.

While there has been shown in Figs. 1 and 2 a helix comprising a turn and a half of the wire support 31, it is to be understood that the helix may be made longer with additional turns and that additional turns may be added with lesser spacing between each turn or with a finer pitch of the helix. However, in any case the axial length of the helix will be a fraction of the length of the filament passing midway therethrough. In one application of the invention, the supports 31 were made of No. 20 B&S gauge tinned copper wire with the turns of the helix spaced apart a distance of about one-sixteenth of an inch. A vibration-suppressing liquid of a neutral oil of viscosity S. A. E. 90 was satisfactorily retained in the helix, not only for normal operation of the galvanometer, but also was retained therein with such effectiveness that the galvanometers could be shipped in the usual manner without loss of the damping liquid though the instrument was subjected to the usual blows and impacts incident to shipment. An oil having a viscosity as high as S. A. E. 90 is not volatile and will continue to function in a galvanometer over a period of years without loss due to evaporation, and the like.

It is contemplated that oils of differing viscosity may be utilized and other liquids having adequate adherence with the turns of the helix may be utilized in connection with galvanometers, the important requirements being the presence of high surface tension, the stability of the fluid as against deterioration and evaporation, and the lack of tendency to creep or flow along the filamentary suspension. The neutral oil of viscosity of S. A. E. 90 satisfactorily meets the foregoing requirements. Thus, the suspension need not be coated, though of course it could be, with a material which would inhibit the tendency to creep, as for example, shellac. Oils within the viscosity range of S. A. E. 30 to S. A. E. 90 have been tried and also found to be satisfactory, the lower viscosity oils being more suitable for galvanometers of high sensitivity, and the higher viscosity oils being more suitable for galvanometers of low sensitivity. In galvanometers having a relatively high restoring force, that is to say those of low sensitivity, heavier materials such as soft petrolatum or Vaseline also have been found to be satisfactory for inhibiting or damping out the undesired motions of the filamentary suspensions.

In comparative tests conducted on galvanometers of the type disclosed in Fig. 1, one galvanometer having applied thereto the present invention and the other without the invention, the results obtained further illustrate the advantages attained. More particularly, the two galvanometers each had a natural period of 2.6 seconds, a critical damping resistance of 60 ohms, a 15-ohm system resistance, and a sensitivity such that the indicating means showed a deflection of 1 millimeter per ½ microvolt applied to the coil, the deflection being on a scale disposed at an effective distance of 3½ meters from the mirror affixed to the galvanometer suspension. In neither galvanometer were shock-absorbing devices used, such as rubber mounts. To insure that each galvanometer would be subjected to the same disturbance, a calibrated 200-gram weight was suspended by a string 11" long. The weight was then swung through an arc of 1⅝" and released to strike the galvanometer frame at about its center. The coil of the galvanometer provided with the liquid vibration-suppressing means deflected an average of only 3 millimeters from its zero position, passed through zero but once, and always came to rest upon its return to zero. The galvanometer after receiving the impact was again stable and in readiness for measurements within an average time of from only 2 to 3 seconds after the impact from the 200-gram weight.

In contrast, the galvanometer without the liquid vibration-suppressing means deflected an average of 20 millimeters from its zero position, passed through zero an average of 3 times, coming to rest at zero the fourth time. On the average it required an overall time of 14 seconds for the galvanometer to return to a condition in readiness for further measurements.

The advantage of the present invention, therefore, is made plainly apparent in that the time during which the galvanometer is unusable as a measuring device is markedly decreased, and additionally the advantage of the invention in assembly and adjustment operations will be further appreciated by considering the fact that there is necessarily a disturbance of the suspension system with each adjustment, as for example the positioning of the mirror at its zero location, and the like. Before it can be ascertained that the adjustment is satisfactory, time must elapse for the galvanometer coil to come to rest. Thus, for each disturbance there will be a substantial saving of time.

Figure 3:
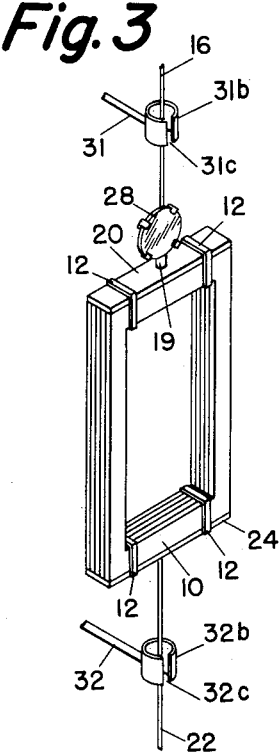
Fig. 3 is a fragmentary perspective view of the galvanometer of Fig. 1 illustrating a modification of the invention applied thereto.

While helixes or spirals of various pitch have been disclosed as satisfactory for the retention of the localized vibration-suppressing liquid surrounding each filamentary suspension, it is contemplated within the scope of the present invention that other configurations or forms of holders or supports for the liquid may be utilized. More particularly, the supports may comprise a series of split rings closely spaced one to the other, and they would appear in much the same way as the helical turns of Fig. 2 except that the adjacent rings would be welded to a down-turned end of wire 31. Instead of the spaced rings, there may be utilized cylindrical ends 31b and 32b secured to the ends of the wires 31 and 32, as shown in Fig. 3. For ease in application to the galvanometer these cylindrical ends 31b and 32b may be provided with narrow slits 31c and 32c for ease in application to the suspensions or filaments 16 and 22. It is to be further understood the narrow slits 31c and 32c may also be of sawtooth character with spacing between the adjacent teeth somewhat greater than the dimensions of the filament for ease of passage of the filament therethrough. Such a zig-zag shaped opening may sometimes be preferred.

Galvanometers of the type shown in the drawing are to be taken as exemplary of instruments to which the invention is applicable. More particularly, galvanometers of the highly sensitive type ordinarily include but a single filamentary suspension, such as the filament 16 which is wholly relied upon for the support of the coil 10, and also is wholly relied upon for the restoring force to return the coil 10 to zero position after deflection thereof. In such galvanometers the lower end of the coil 10 is unrestrained, this objective being attained by utilizing a highly flexible coiled conductor extending from the lower end of the coil for electrical connection to a terminal located on a lower portion of the galvanometer frame.

With such a galvanometer an undesired motion-suppressing device of the type shown in Fig. 2 was located just below the lower post 23 of the coil 10 and it was found that such device decreased the sensitivity of the galvanometer. While in some cases a slight decrease in sensitivity might be tolerated, it would not be desirable for an instrument designed for greatest sensitivity. By moving the undesired motion-suppressing device to an upper position above the coil 10 as illustrated by the spiral 31a of Fig. 1, such device was found to be highly effective and adequate to provide the desired vibration suppression for the high sensitivity galvanometer without in any way decreasing the sensitivity thereof. Thus, for the single upper-suspension galvanometers wherein it is desired to maintain the high sensitivity, it is preferable to mount the holder for the vibration-suppressing liquid above the galvanometer coil.

What is claimed is:

1. In a system wherein a body is supported for rotation about the axis of a single supporting filament, the body being of relatively great mass as compared to its suspension system, means for resisting every movement of the body which displaces its supporting filament from said axis of rotation while permitting free rotation of said body comprising a holder having an extended support-area for a body of viscous liquid, said holder being disposed in encircling relation solely with said filament and having portions of said extended support-area spaced apart to form an opening along the side thereof to permit said holder to be mounted around said filament without disturbing the latter from its support, said holder having an axial length a fraction of that of said filament, said filament passing substantially midway therethrough, and an isolated body of viscous liquid retained in said holder on said extended support-area by adhesion and surface tension for exerting upon displacement of said filament from said axis of rotation a damping force effective over an axial length coextensive with the axial depth of said body of liquid.

2. In a system wherein a body is supported for rotation about the axis of a single supporting filament, the body being of relatively great mass as compared to its suspension system, means for resisting every movement of the body which displaces its supporting filament from said axis of rotation while permitting free rotation of said body comprising a plurality of open-ended holders for liquid disposed in encircling spaced relation solely with said filament intermediate the ends thereof, said holders having extended support-areas with portions thereof spaced apart axially of said filament for supporting a liquid by the forces of surface tension and adhesion, the filament passing substantially midway therethrough, and an isolated liquid retained in each of said holders by adhesion and surface tension for exerting a damping force solely upon said filament for inhibiting undesired vibrations and oscillations of said filament without interfering with rotational movement of said body about the axis of its supporting filament.

3. A galvanometer assembly comprising a rotatable element, a single filament connected to and extending above and below said rotatable element, said rotatable element having a mass substantially greater than that of said filament, resilient supporting means at each end of said filament for applying tension thereto and for mounting said rotatable element for rotation about its axis of suspension, a plurality of separate supports for isolated bodies of liquid, at least one of said last-named supports disposed respectively between each said resilient supporting means and said rotatable element, each of said supports for liquid having an axial length a fraction of that of said filament and disposed in encircling spaced relation with said filament intermediate the ends thereof, said filament extending centrally therethrough, and each of said last-named supports having an extended support-area including spaced portions holding an isolated body of viscous liquid in intimate contact with said filament by adhesion and surface tension, thereby bridging the space between the encircling axial length of said last-named supports and said filament for inhibiting undesired vibrations and oscillations of said filament without interfering with rotational movement of said element about its axis of suspension.

4. In a galvanometer of high sensitivity, the combination comprising a rotatable coil element, supporting means for said element, a single filamentary suspension connected to said supporting means and to the upper end of said rotatable coil element for vertically mounting it for rotation about the longitudinal axis of said filamentary suspension, said rotatable coil element having a mass substantially greater than that of said filamentary suspension, and means including a stationary open-ended holder having an extended support-area disposed in encircling spaced relation solely with said filamentary suspension and supporting an isolated viscous liquid in contiguous surrounding relation therewith by adhesion and surface tension for suppressing undesired vibrations or oscillations of said filamentary suspension without interfering with rotational movement of said element about its axis of suspension in avoidance of decrease in sensitivity of the galvanometer.

5. In a galvanometer of predetermined sensitivity the combination comprising a rotatable coil element, vertically spaced means supporting said element on a single filamentary suspension means mechanically connected to said spaced means and to said rotatable coil element thereby permitting rotational response of said element about the axis of said single filamentary suspension; said rotatable coil element having a mass substantially greater than that of said filamentary suspension, and means including a support disposed in closely spaced relation with only an axial section of said filamentary suspension, said support including an extended support-area having spaced apart portions surrounding said axial section sufficiently to maintain a body of viscous liquid in contiguous surrounding relation with said axial section of said filamentary suspension for suppressing undesired vibrations or oscillations of said filamentary suspension without interfering with rotational movement of said rotatable coil element about its axis of suspension, thereby avoiding decrease in the sensitivity of the galvanometer.

6. The combination set forth in claim 5 wherein said support for said viscous liquid is of configuration including an open passage and said portions of said extended support-area are spaced apart along the side of said support to permit said support to be threaded about said filamentary suspension and secured in place without disconnection of said suspension from said vertically spaced means or said coil element.

7. The combination set forth in claim 5 wherein said support for said viscous liquid includes a supporting arm extending therefrom, one end of said supporting arm having an extended portion thereof for cooperation with means for mounting said liquid support which provides for limited adjustment of said liquid support axially of said filamentary suspension.

8. The combination set forth in claim 6 wherein said support for said viscous liquid comprises a wire structure including a helically wound portion for extending about said filamentary suspension with turns spaced apart to provide an extended area for retention of the viscous liquid therein and having a supporting arm extending therefrom.

9. The combination set forth in claim 6 wherein the support for said viscous liquid comprises a hollow cylindrical member for extending about said filamentary suspension, said cylindrical member having an axial length a fraction of that of said filamentary suspension, and said cylindrical member having a slit extending the full axial length thereof for passage therethrough of said filamentary suspension in positioning said cylindrical member in surrounding relation therewith.

10. In a system as defined in claim 1 wherein said support disposed in encircling relation with said filament is of helical configuration with its axis substantially coincident with the rotational axis of the filament.

11. A galvanometer comprising a frame member, a rotatable element mounted therein, anchoring members each connected by a single filament to the corresponding opposite ends of said rotatable element for anchoring same to opposite ends of said frame member, said rotatable element having a mass substantially greater than that of said filament, a member supported by said frame member and including a helix surrounding a portion of said filament, and a liquid vibration-suppressing medium held by said helix in intimate contact with said filament.

12. A galvanometer comprising a frame member, a rotatable coil suspended between a pair of suspension filaments mounted in said frame member for rotation of said coil about the common axis of said filaments, anchoring members connected to the outer ends of said filaments for anchoring said coil to opposite ends of said frame member, said coil having a mass substantially greater than that of said filaments, a member disposed to one side of said coil in stationary position relative to said frame member and including a portion in encircling spaced relation solely with one of said suspension filaments, said encircling portion including elements thereof spaced apart along said common axis of said filaments, and said encircling portion having an inner diameter of dimensions adapted effectively to retain therein a liquid vibration-suppressing medium by adhesion and surface tension for intimate contact of the liquid with said one of said suspension filaments to suppress undesired vibrations of the latter without interfering with the rotational movement of said coil about said common axis of said filaments.

13. Apparatus according to claim 12 including a second member disposed to the other side of said coil, corresponding to said first-named member disposed to said one side of said coil in stationary position relative to said frame member, and said second member including a portion with spaced apart elements in encircling spaced relation solely with the other one of said suspension filaments for holding a liquid vibration-suppressing medium in contact with the latter.

14. A galvanometer comprising a frame member, a rotatable element mounted therein, anchoring members each connected by a single filament to the corresponding opposite ends of said rotatable element for anchoring same to opposite ends of said frame member, said rotatable element having a mass substantially greater than that of said filament, structure supported by said frame member and including a plurality of spaced surfaces surrounding a portion of said filament, said surfaces being disposed intermediate the ends of said filament and spaced axially thereof from said rotatable element, and a liquid vibration-suppressing medium held by said spaced surfaces in intimate contact with said filament and bridging the space between said filament and said surfaces and out of contact with said rotatable element.

15. A galvanometer comprising a frame member, a rotatable element mounted therein, anchoring members each connected by a single filament to the corresponding opposite ends of said rotatable element for anchoring same to opposite ends of said frame member, said rotatable element having a mass substantially greater than that of said filament, structure supported by said frame member and including an extended support-area adjacent a portion of said filament, said extended support-area including elements thereof spaced apart to form an opening along said filament to permit said sructure to be mounted solely around said filament without disturbing the latter from said anchoring members, and a liquid vibration-suppressing medium held by said support-area in intimate contact with said filament, said support-area surrounding said filament sufficiently to retain said liquid in contiguous surrounding relation with said filament by adhesion and surface tension.

References Cited in the file of this patent

UNITED STATES PATENTS

| | | |
|---|---|---|
| 799,733 | Hartmann | Sept. 19, 1905 |
| 1,019,432 | Dempster | Mar. 5, 1912 |
| 1,397,441 | Miller | Nov. 15, 1921 |
| 1,551,374 | Davey | Aug. 25, 1925 |
| 1,728,555 | Legg | Sept. 17, 1929 |
| 1,860,740 | Hayes | May 31, 1932 |
| 1,951,578 | Peters | Mar. 20, 1934 |
| 2,268,526 | Palmer | Dec. 30, 1941 |
| 2,519,689 | Morrow | Aug. 22, 1950 |